United States Patent [19]

Marquardt

[11] Patent Number: 4,656,890

[45] Date of Patent: Apr. 14, 1987

[54] COUPLING FOR A PLANETARY RING GEAR

[75] Inventor: Julius F. Marquardt, Westchester, Ill.

[73] Assignee: Dresser Industries, Inc., Dallas, Tex.

[21] Appl. No.: 810,626

[22] Filed: Dec. 19, 1985

[51] Int. Cl.[4] .............................................. F16H 1/28
[52] U.S. Cl. ...................................... 74/801; 403/337
[58] Field of Search ......................... 74/801, 785, 788; 403/4, 334, 337, 97

[56] References Cited

U.S. PATENT DOCUMENTS

| | | | |
|---|---|---|---|
| 3,756,095 | 9/1973 | McCay et al. | 74/801 |
| 4,047,770 | 9/1977 | Korenhof et al. | 308/191 |
| 4,074,946 | 2/1978 | Swearingen | 403/337 X |
| 4,091,688 | 5/1978 | Huffman | 74/801 X |
| 4,159,657 | 7/1979 | Stilley | 74/801 |
| 4,191,487 | 3/1980 | Schultenkamper | 403/337 |
| 4,352,528 | 10/1982 | Guimbretiere | 308/189 |
| 4,384,498 | 5/1983 | Eichinger | 74/801 X |
| 4,546,844 | 10/1985 | Stauffer | 74/801 X |
| 4,562,903 | 1/1986 | Rogier | 74/801 X |

OTHER PUBLICATIONS

The Story of Planetary Axles, Pioneered, Perfected and Manufactured by Rockwell—Standard Corporation.
Radkopf AP—409, ('83), Blueprint, "Planetary Gear Information".

Primary Examiner—George H. Krizmanich

[57] ABSTRACT

The planetary gear system includes a drive shaft extending rotatably through a hollow spindle which is fixed and a system of planetary gears driven by gear teeth on the shaft. The planetary gears operate within a stationary ring gear which is secured to the spindle by meshed, wedge-shaped, coupling teeth that are held in engagement to eliminate relative rotational movement therebetween.

9 Claims, 5 Drawing Figures

COUPLING FOR A PLANETARY RING GEAR

BACKGROUND OF THE INVENTION

This invention relates generally to improved planetary gear systems. More particularly, but not by way of limitation, this invention relates to an improved planetary gear system for reducing speed and increasing torque from a drive axle that includes a face type coupling for preventing the rotation of the planetary gear carrier.

Planetary gear systems are not new. Insofar as applicant is aware, planetary gear systems have generally had the planetary carrier locked to the spindle against rotation through a spline connection. Wheel assemblies utilizing planetary gear systems of this type are utilized in a Caterpillar 988E loader and in Model FD-70500 planetary drive axles manufactured by Clark Equipment Co. An assembly of this type has also been utilized in the past by the assignee of this application in Models H400C and 570A wheel planetaries manufactured by International Hough Division of Dresser Industries, Inc.

While these arrangements have operated with reasonable success, they are subjected to extremely high loads and to sudden reversals of those loads. Spline connections are manufactured to include tolerances so that they can be assembled. The tolerances permit slight relative rotational movement and the reversal of loading, sometimes results in spline wear difficulties.

Gleeson Works of Rochester, N.Y. has developed a face type coupling which they market under the trademark "Curvic". Each part of the Curvic couplings includes a plurality of circumferentially spaced coupling teeth that are arranged to mate. The teeth are generally wedge shaped, in the axial direction and in a direction perpendicular to the axial center line or axis of the coupling. Accordingly, the coupling has the advantages of wedging tightly together when the coupling is engaged and retained in engagement and of being self-centering if properly applied.

Face type couplings have been utilized in axle assemblies as illustrated in U.S. Pat. No. 4,047,770, issued Sept. 13, 1977 to Korenhof et al. and in U.S. Pat. No. 4,352,528 issued Oct. 5, 1982 to Guimbretiere. While these are not necessarily the "Curvic" couplings, they are face type couplings. However, it is noted in those patents that the coupling arrangement is utilized for the purpose of transmitting rotation from the driving to the driven member and not for the purpose of locking a stationary member to prevent rotation.

An object of this invention is to provide an improved planetary gear system that obviates the disadvantages mentioned hereinbefore, that is, one that can be manufactured without the problem of tolerances that occurs with spline connections, one that is self-centering, and one that wedges together to prevent relative movement between the members of the coupling.

SUMMARY OF THE INVENTION

This invention then provides an improved planetary gear system which comprises a hollow spindle having a longitudinal axis. The spindle has a plurality of radiating, circumferentially spaced coupling teeth on an annular surface thereof with the annular surface being disposed generally perpendicular to the axis. A drive shaft is located in the spindle and rotatable relative thereto. The shaft has gear teeth on the end thereof that projects from the end of the spindle. A driven hub is rotatably mounted on the spindle and the hub carries a plurality of circumferentially spaced planetary gears meshing with the gear teeth on the drive shaft. A ring gear assembly encircles the planetary gears and includes a ring gear in mesh therewith and a ring gear carrier that encircles the shaft. A surface on the carrier confronts the end surface on the spindle and includes a plurality of radiating, circumferentially spaced coupling teeth that are in mesh with the coupling teeth on the spindle. The coupling teeth are held in mesh to lock the carrier to the spindle so that driving and reverse loads impose thereon are transferred into the spindle.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
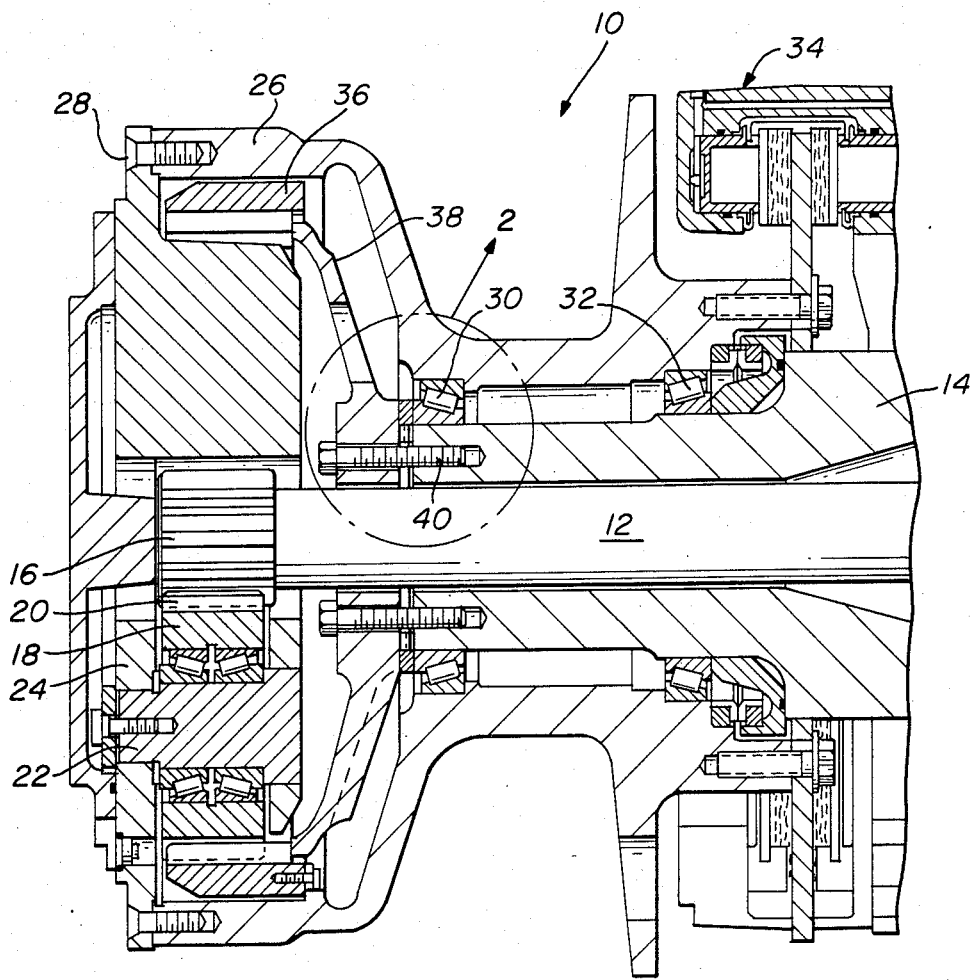
FIG. 1 is a cross-sectional view of an axle assembly that includes a planetary gear system constructed in accordance with the invention.

Referring to the drawing, and to FIG. 1 in particular, shown therein and generally indicated by the reference character 10, is an axle assembly that includes a planetary gear system that is constructed in accordance with the invention. The axle assembly 10 includes a drive axle shaft 12 that extends through a housing spindle 14. The shaft 12 is rotatable relative to the spindle 14. At its outermost end, the axle 12 is provided with a plurality of gear teeth 16 that are in mesh with a plurality of planetary gears 18 (only one planetary gear 18 is illustrated in FIG. 1).

It will be understood that preferably three of the planetary gears 18 are equally distributed about the shaft 12. Each of the planetary gears 18 includes teeth 20 that are in mesh with the gear teeth 16 on the shaft 12. Thus, rotation of the shaft 12 causes rotation of the planetary gears 18 about planetary gear shafts 22. The planetary gear shafts 22 are secured to a planetary gear carried 24 which is fastened to a wheel hub 26 by a plurality of circumferentially spaced, threaded fasteners 28.

The wheel hub 26 encircles the shaft 12 and spindle 14 and is rotatably supported on the spindle 14 by a tapered roller bearing 30 and a tapered roller bearing 32. It will be understood that a wheel, sprocket or the like (not shown) will be attached to the hub 26 by a plurality of lug bolts or the like (not shown) when the axle assembly 10 is installed on a vehicle. If used on conveyors or other types of equipment (not shown) requiring a speed changer, the spindle may be attached to the structure so that the spindle can be held against rotation. At the innermost end of the axle assembly 10, there can be seen a brake assembly 34 which functions to slow or stop rotation of the hub 26 and of the wheel or sprocket attached thereto.

When used in a vehicle, the power from the prime mover of the vehicle will be transferred in the form of rotation through the axle shaft 12 and the gear teeth 16 thereon. That rotation will be transmitted into the planetary gears 18 which rotate not only about the axle 12, but also about the interior of the ring gear 36 which is held stationary due to the interaction of the coupling teeth 50 and 52. Accordingly, a very high reduction in speed is accomplished through the gear train and a large increase in torque available at the hub 26. It will be appreciated that since the teeth 50 and 52 are tightly wedged together, there will be no relative movement therebetween, and thus, the ring gear carrier 38 will be held securely in the stationary position despite the direction of the forces and load applied thereto. Accordingly, one source of wear and of possibly more serious problems has been eliminated in the assembly 10 due to the use of the coupling teeth 50 and 52 for securing the ring gear carrier 38.

To complete the gear reduction system there is located within the hub 26, a ring gear 36 that is attached to a ring gear carrier 38. As clearly illustrated, the ring gear carrier 38 extends radially inwardly and is connected to the end of the axle spindle 14 by a plurality of threaded fasteners 40.

Figure 2:
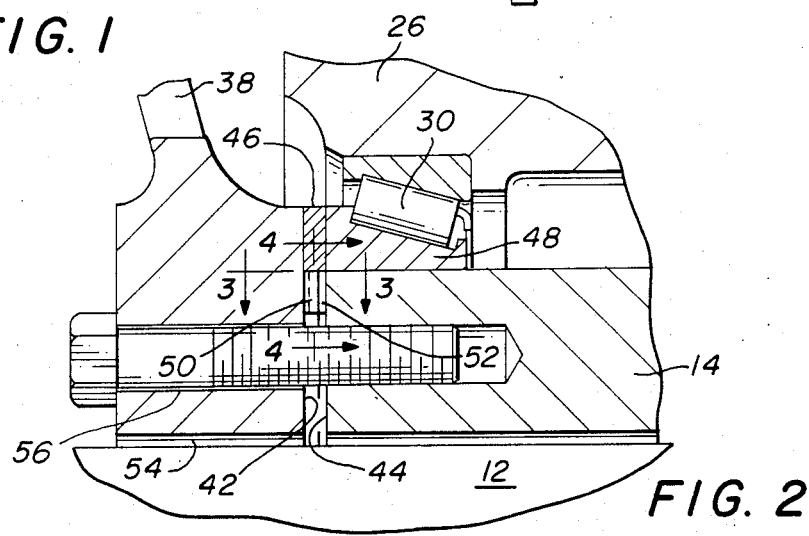
FIG. 2 is an enlarged, fragmentary view, illustrating in more detail the area of the system of FIG. 1 indicated by the line 2—2 of FIG. 1.

The enlarged fragmentary view of FIG. 2 illustrates in more detail the connection of the ring gear carrier 38 with the spindle 14. As illustrated therein, the carrier 38 is provided with an annular surface 42 that is disposed adjacent to a confronting, annular end surface 44 on the spindle 14. An annular spacer member 46 has been disposed in engagement with the surface 42 and in engagement with an inner race 48 of the tapered roller bearing 30 to hold the bearing 30 and the hub 26 in position on the spindle 14. In the embodiment illustrated in FIGS. 1 and 2, the inner race 48 of the bearing 30 is mounted on the exterior of the spindle 14.

Figure 3:
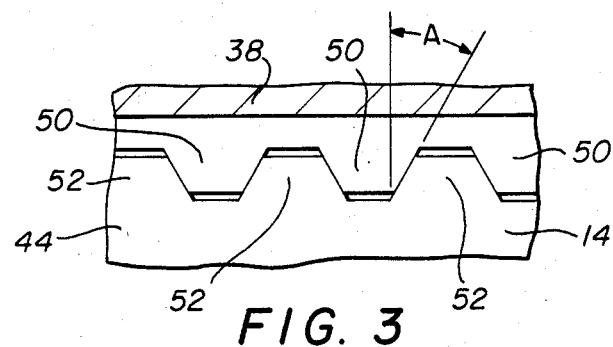
FIG. 3 is an enlarged cross-sectional view taken generally along the line 3—3 of FIG. 2.
Figure 4:
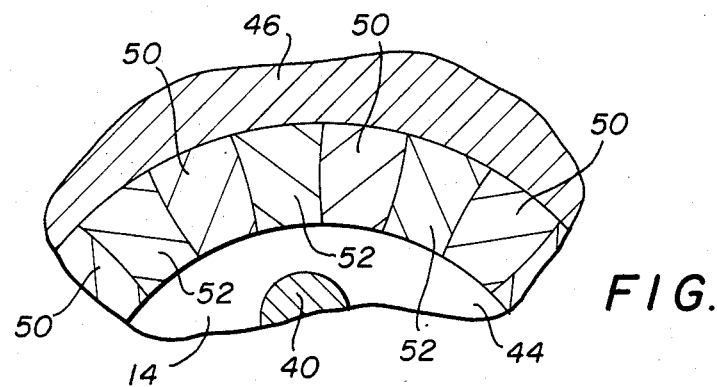
FIG. 4 is a cross-sectional view taken generally along the line 4—4 of FIG. 2.

As shown more clearly in FIGS. 3 and 4, coupling teeth 50 are formed in the annular surface 42 on the carrier 38 and project toward the spindle 14. Similarly, coupling teeth 52 are formed in the annular surface 44 on the end of the spindle 14. Thus, and when assembled as illustrated in FIGS. 1 through 4, the threaded fasteners 40 place the coupling teeth 50 and 52 in mesh and wedge them securely together avoiding any relative movement and centering the carrier 38 with respect to the spindle 14.

As can be seen in FIG. 3, the teeth 50 and 52 have a cross section taken parallel to the axis that is wedge shaped in configuration. Thus, as the fasteners 40 are tightened, the teeth 50 and 52 are brought into tighter engagement so that there is no relative rotation movement between the carrier 38 and the spindle 14. There will, of course, be some tendency for load forces imposed on the assembly 10 through bearings 30 and 32 to separate the carrier 38 from the spindle 14 due to the wedge configuration. The fasteners 40 are sized to absorb axial loads generated as a result of the pressure angle A and generated as a result of the tapered configuration of the bearings 30 and 32.

FIG. 4 illustrates a cross section taken through the coupling teeth 50 and 52 in a direction generally perpendicular to the axis of the axle. The teeth 50 and 52 are generally wedge shaped in this direction and thus tend to be self centering, as previously mentioned. Also, and as illustrated, the sides of such teeth are alternately convex and concave so that they interfit. Such arrangement increases the tendency for the coupling to be self centering.

To assure that self centering can occur, the carrier 38 has a bore 54 extending therethrough which is larger than the outer diameter of the shaft 12 so that as the threaded fasteners are tightened, the carrier 38 can move in a direction perpendicular to the axis of the shaft 12 until centering is attained. Also, fastener holes 56 extending through the carrier 38 are larger than the fasteners 40 to permit lateral movement during centering.

Figure 5:
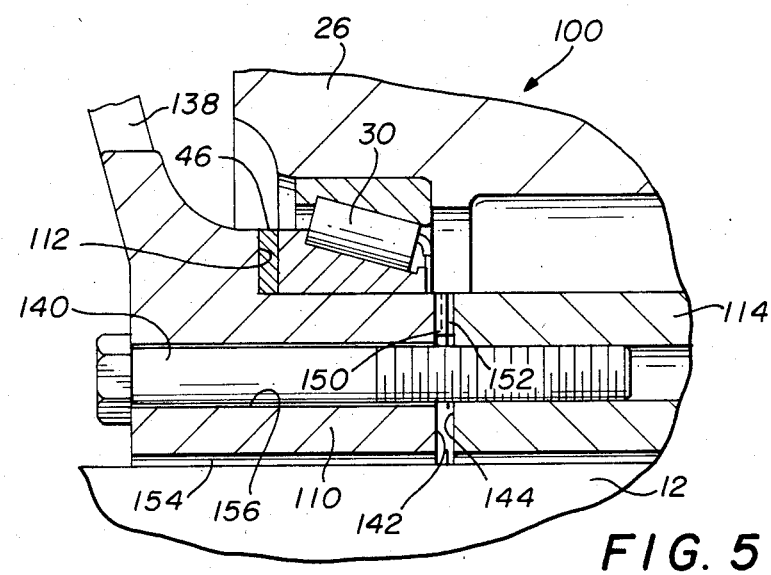
FIG. 5 is a view similar to FIG. 2 but illustrating a modification of the planetary gear system that is also constructed in accordance with the invention.

The Modification of FIG. 5

FIG. 5 is an enlarged fragmentary view similar to FIG. 2 and includes many components that are identical to those previously described. The unmodified components are designated by the same reference characters as those used in the description of the embodiment of FIGS. 1 through 4. As shown in FIG. 5, the gear reduction assembly is designated by the reference character 100 and includes the wheel hub 26 that is rotatably located by tapered bearings 30 and 32 (bearing 32 is not shown in FIG. 5). It will be understood that the bearing 32 is located on a modified form of the spindle which is designated by the reference character 114.

A ring gear carrier 138 is very similar in structure to the ring gear carrier 38, but includes an extended portion 110 that forms an annular, radially disposed a shoulder 112. The spacer 46 is located on the extension 110 in engagement with the shoulder 112 and engages inner race 48 of the bearing 30 as described in connection with the embodiment of FIG. 1.

An annular surface 142 located on the end of the carrier 138 confronts an annular surface 144 on the end of the modified form of the spindle 114. Formed on the surfaces 142 and 144 are coupling teeth designated by the reference characters 150 and 152. The teeth 150 and 152 are in all respects identical to and function in the same way as did the coupling teeth 50 and 52 previously described.

The ring gear carrier 138 is held assembled with the spindle 114 by a plurality of bolts 140 which are spaced circumferentially about the carrier 138. As mentioned with respect to the embodiment of FIG. 2, centering is permitted in the assembly 110 by enlarging a bore 154 that extends through the carrier 138 so that it is larger than the outer diameter of the shaft 12. Accordingly, lateral movement of the carrier 138 relative to the shaft 12 can occur as the threaded fasteners 140 are tightened. Also to compensate for centering movement that may occur between the carrier 138 and the fasteners 140 during tightening, fastener holes 156 are larger than the outer diameter of the fasteners 140.

From the foregoing, it will be seen that the planetary gear system described provides for the positive locking of the ring gear carrier with the spindle so that no rotational movement occurs therebetween and provides for the centering of the ring gear carrier so that accurate assembly of the planetary gear system and the ring gear occur. Despite the accuracy required, the system can be manufactured more efficiently since fine or close tolerances do not have to be maintained as is true when manufacturing the previously known parts of an I.D., O.D. spline connection between the ring gear carrier and the spindle.

While the invention has been illustrated as being in an axle drive assembly for a vehicle, it will be appreciated that the planetary gear system when constructed in accordance with the invention may be utilized in other apparatus where speed reduction or speed increase with appropriate torque increase or decrease is desired.

It will be appreciated that many changes and modifications can be made to the apparatus described in detail hereinbefore without departing from the spirit or scope of the invention.

What is claimed is:

1. A planetary gear system, said system comprising:
   a hollow spindle having a longitudinal axis, said spindle having a plurality of radiating, circumferentially spaced coupling teeth on an annular surface thereon, said annular surface being disposed generally perpendicularly to said axis;
   a drive shaft located in said spindle and rotatable relative thereto, said shaft having gear teeth on an end thereof projecting from the first end of said spindle;
   hub means rotatably mounted on said spindle adjacent to the first end thereof, said hub means carrying a plurality of circumferentially spaced planetary gears meshing with said gear teeth;
   ring gear means encircling said planetary gears in mesh therewith, said ring gear means including a ring gear and a ring gear carrier encircling said shaft and having a carrier surface thereon confronting the end surface on said spindle, said carrier surface including a plurality of radiating, circumferentially spaced coupling teeth in mesh with the coupling teeth on said spindle; and,
   means maintaining said coupling teeth in mesh for transferring driving and reverse loading into said spindle when said hub is driven by said shaft, planetary gears and ring gear.

2. The system of claim 1 wherein said coupling teeth have a generally wedge-shaped cross-section taken generally parallel to said axis whereby relative rotational movement between said ring gear means and spindle is eliminated when said coupling teeth are in engagement.

3. The system of claim 1 wherein said coupling teeth having a generally wedge-shaped cross-section taken generally perpendicularly to said axis for holding an axis of said ring gear means is in axial alignment with the axis of said spindle when said coupling teeth are in engagement.

4. The system of claim 2 wherein said coupling teeth have a generally wedge-shaped cross-section taken generally perpendicularly to said axis whereby an axis of said ring gear means is in axial alignment with the axis of said spindle when said coupling teeth are in engagement.

5. The system of claim 4 wherein said means maintaining said coupling teeth in mesh includes a plurality of threaded fasteners extending through said carrier and connecting said ring gear carrier to said spindle.

6. The system of claim 1 and also including:
   tapered bearing means disposed between said hub means and said spindle; and,
   spacer means located between said ring gear carrier and said bearing means whereby said ring gear carrier prevents axial movement of said bearing when said hub is loaded.

7. The system of claim 5 and also including:
   tapered bearing means disposed between said hub means and said spindle; and,
   spacer means located between said ring gear carrier and said bearing means whereby said ring gear carrier prevents axial movement of said bearing when said hub is loaded.

8. The system of claim 5 and also including:
   spacer means located between said ring gear carrier and said bearing means whereby said ring gear carrier prevents axial movement of said bearing when said hub is loaded;
   an annular shoulder on the exterior of said ring gear carrier is in engagement with said spacer means; and
   bearing means including spaced, tapered, first and second bearings with said first bearing located between said hub means and said ring gear carrier in engagement with said spacer means and said second bearing located between said hub means and said spindle.

9. The system of claim 5 wherein said ring gear carrier includes:
   holes through which said fasteners pass, said holes being larger than said fasteners to permit aligning movement of said ring gear carrier when said fasteners are tightened meshing said coupling teeth; and,
   a bore larger than said axle to permit said carrier to move for alignment.

* * * * *